United States Patent
Kuwano et al.

(10) Patent No.: US 7,088,072 B2
(45) Date of Patent: Aug. 8, 2006

(54) MOTOR CONTROL SYSTEM

(75) Inventors: Yoshifumi Kuwano, Kiryu (JP); Hiroaki Taka, Kiryu (JP); Akio Takemori, Kiryu (JP)

(73) Assignee: Japan Servo Co., Ltd., Tokyo (JP)

( * ) Notice: Subject to any disclaimer, the term of this patent is extended or adjusted under 35 U.S.C. 154(b) by 0 days.

(21) Appl. No.: 11/259,114

(22) Filed: Oct. 27, 2005

(65) Prior Publication Data

US 2006/0091843 A1    May 4, 2006

(30) Foreign Application Priority Data

Oct. 29, 2004  (JP)  ............................. 2004-315023
May 31, 2005  (JP)  ............................. 2005-159349

(51) Int. Cl.
    *G05B 19/40*    (2006.01)
(52) U.S. Cl. ..................... 318/685; 318/696; 310/49 R
(58) Field of Classification Search ................ 318/685, 318/696; 310/49 R
    See application file for complete search history.

(56) References Cited

U.S. PATENT DOCUMENTS 4,818,908 A * 4/1989 Tamae et al. ............... 310/171
5,760,359 A * 6/1998 Nakano et al. ............. 318/603
6,249,495 B1 * 6/2001 Okada et al. ............ 369/44.28

FOREIGN PATENT DOCUMENTS

JP          06-343294 A        12/1994

* cited by examiner

*Primary Examiner*—Rita Leykin
(74) *Attorney, Agent, or Firm*—Birch, Stewart, Kolasch & Birch, LLP (57) ABSTRACT

A stepping motor control system according to the present invention includes a counting mechanism for counting the number of steps of the pulse train command, a latch mechanism for holding a counting value of the counting mechanism with a latch signal and finding a position command, a reference signal generating mechanism for generating the latch signal and a reference clock signal, a first calculating mechanism for calculating a pulse spacing of the pulse train command with the reference clock signal, and a second calculating mechanism for calculating a time interval from generation of the pulse train command to generation of the latch signal with the reference clock signal. In the stepping motor control system, the position command is corrected using command pulse spacing information calculated by the first calculating mechanism and time difference information calculated by the second calculating mechanism.

4 Claims, 7 Drawing Sheets

MOTOR CONTROL SYSTEM

BACKGROUND OF THE INVENTION

1. Field of the Invention

This invention relates to a motor control system that carries out positioning control according to the position command of a pulse train and, more particularly, to a micro step control system for a stepping motor.

2. Description of the Prior Art

In a conventional stepping motor control system, up-count or down-count of a pulse train command externally applied is carried out by an up/down counter depending upon a rotational direction signal, data on an excitation signal corresponding to a calculated value of the up/down counter are stored in a ROM, the data stored in the ROM are converted into a voltage signal by a D/A converter, the voltage signal of the D/A converter is amplified by a drive amplifier, and a stepping motor is driven. In this construction, it is possible to cause the stepping motor to be smoothly rotated by converting the data in the ROM into a false sine wave and increasing the number of dividing of one period of the false sine wave.

In such a stepping motor control system, in order that the stepping motor can be smoothly rotated, it is necessary to rapidly carry out processing from the generation of the false sine wave of the ROM to the outputting of the voltage signal for driving the stepping motor, each time the pulse train command is generated. In a system that is comprised of hardware such as a logic IC, an OP amplifier or the like, it is possible to perform relatively high-speed processing. However, systems that are equipped with microcomputers or the like are increased at the present time for the purposes of realizing complex arithmetic operation and improving maintenance. In such a system equipped with a microcomputer or the like, it is necessary to speed up the processing of the microcomputer or the like in order that a predetermined arithmetic operation is performed each time the pulse train command is generated and proper voltage is outputted to the stepping motor. There is a problem that the cost of the entire system will raise. In addition, there are limitations of causing the processing by the microcomputer or the like to be carried out at the high speeds, so that there is also a problem that it is hard to carry out a precise control of the motor.

As a step to cope with the above-mentioned problems, there is employed a sampling processing in which a processing speed of the microcomputer or the like is realized at a predetermined cycle, in accordance with counting the step number of the pulse train command at the predetermined cycle according to the internal reference signal of the stepping motor (hereinafter referred to as "sampling processing"). However, in this case, irregular time difference is produced between the cycle of the sampling processing and the generating time of the pulse train command applied from the external and a change in the position command is generated during rotation, resulting in vibration of the rotation.

SUMMARY OF THE INVENTION

It is therefore an object of the present invention to provide a motor control system that can cause a motor to be smoothly rotated.

In accordance with the present invention, there is provided a motor control system for energizing a sine wave-like stairway current according to a pulse train command impressed from an external. The motor control system comprises a first counting means for counting the number of steps of the pulse train command, a latch means for holding a counting value of the first counting means with a latch signal and finding a position command, a reference signal generating means for generating the latch signal and a reference clock signal, a first calculating means for calculating a pulse spacing of the pulse train command with the reference clock signal, and a second calculating means for calculating a time interval of from generation of the pulse train command to generation of the latch signal with said reference clock signal. The position command is corrected using command pulse spacing information calculated by the first calculating means and time difference information calculated by the second calculating means.

In this motor control system, the correction of the position command is carried out utilizing command pulse spacing information calculated by the first calculating means and time difference information calculated by the second calculating means, so that even if irregular time difference is produced between a cycle of the sampling processing and the generating time of the pulse train command applied from the external, it is possible to carry out stable sampling processing, without speeding up the processing speed of the microcomputer or the like, and it is possible to cause the motor to be smoothly rotated.

BRIEF DESCRIPTION OF THE DRAWINGS

The above object and other objects and many of the attendant advantages of the present invention will be readily appreciated as the same becomes better understood by reference to the following detailed description when considered in connection with the accompanying drawings, in which like reference numerals denote the same parts throughout the Figures and wherein.

DETAILED DESCRIPTION OF THE INVENTION

Figure 1:
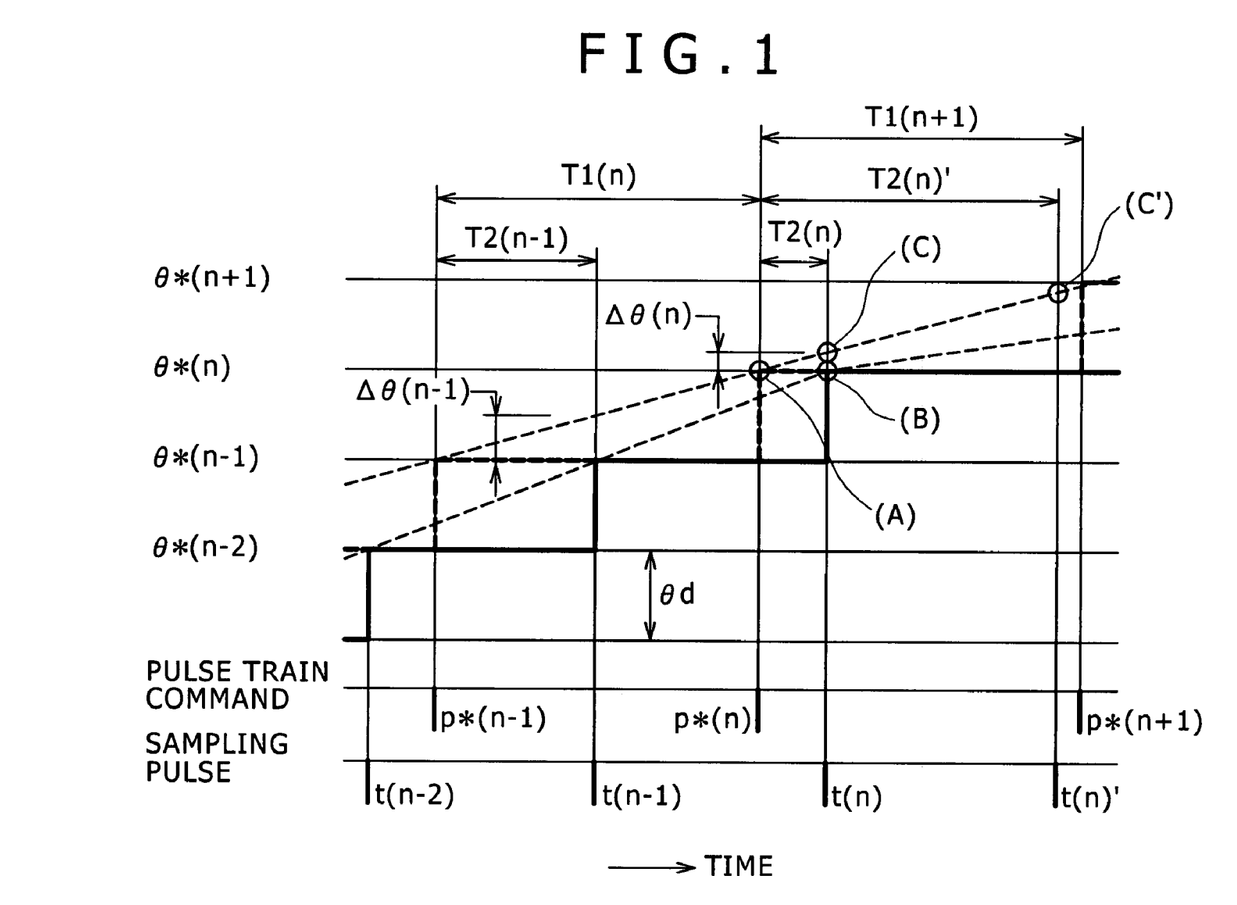
FIG. 1 is an explanatory view which is of assistance in explaining the principle of the present invention.

FIG. 1 is a view which is of assistance in explaining the principle of the present invention and illustrates a relationship between a pulse train command and a position command. In FIG. 1, (A) represents that a position command at the time of a pulse train command $P^*(n)$ being applied is $\theta^*(n)$, whereas (B) represents a case where the position command is sampled with a sampling pulse $t(n)$. (B) is shifted relative to (A) by time $T2(n)$. Therefore, it is conceivable that in a case where a stepping motor is rotated at an average revolution of $\omega=\theta d/T1(n)$, the position command is not $\theta^*(n)$ but a value (C) that is further varied by $\Delta\theta(n)$, at the time when the position command is sampled with the sampling pulse t(n). That is, when the position command $\theta^*(n)$ given according to the pulse train command $P^*(n)$ is sampled with the sampling pulse t(n), an error of $\Delta\theta(n)$ is produced. The pulse train command $P^*(n)$ and the sampling pulse t(n) are asynchronous, so that $\Delta\theta(n)$ is varied per sampling and vibration components are generated in the command.

Therefore, a correction value $\Delta\theta(n)$ of the position command is estimated by, for example, the following equation (1) and the primary position command $\theta^*(n)$ is corrected with the correction value $\Delta\theta(n)$ on the basis of the following equation (2), whereby a position command $\theta c(n)$ after corrected is found.

$$\Delta\theta(n) = \{T2(n)/T1(n)\}\theta d \quad (1)$$

$$\theta c(n) = \theta^*(n) + \Delta\theta(n) \quad (2)$$

Where, T1(n) is a counting value representing a spacing of the pulse train command $P^*(n)$, T2(n) is a counting value representing a time interval of from the generation of the pulse train command $P^*(n)$ to the generation of the sampling pulse t(n) (latch signal), and $\theta d$ is a step angle per one pulse of the pulse train command externally applied. Further, n in the parentheses represents a value corresponding to the nth pulse train command $P^*(n)$. Where it is unnecessary to specially indicate the order of the pulse, (n) is omitted in the following.

Incidentally, for example, where a sampling pulse t(n)' is produced prior to inputting of a pulse train command $P^*(n+1)$, T2(n)' is used in lieu of T2(n) in the equation (1) and the sampling pulse is corrected to a condition indicated by (C') in FIG. 1.

Figure 2:
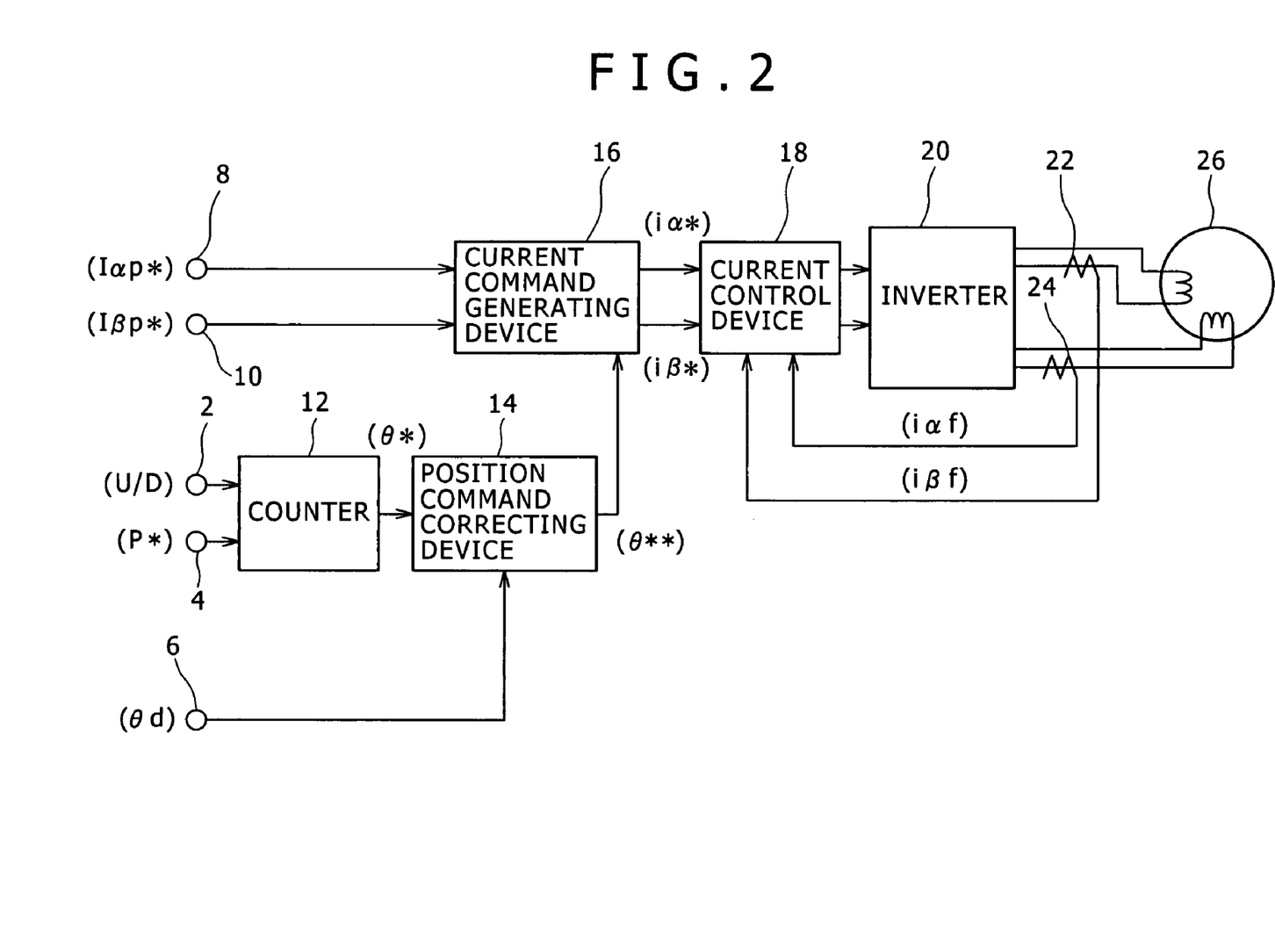
FIG. 2 is a view illustrating a stepping motor control system according to a first embodiment of the present invention.

Referring now to FIG. 2, the stepping motor control system according to the present invention will be discussed hereinafter. In FIG. 2, reference numeral 2 denotes a direction command entrance terminal, reference numeral 4 designates a pulse train command entrance terminal, reference numerals 8, 10 denote a first phase current command entrance terminal and a second phase current command entrance terminal, respectively, reference numeral 12 designates a counter for converting a pulse train command $P^*$ into a position command $\theta^*$, reference numeral 14 indicates a position command correcting device, reference numeral 16 denotes a current command generating device, reference numeral 18 designates a current control device, reference numeral 20 denotes an inverter, reference numerals 22, 24 denote a first phase current detecting device and a second phase current detecting device, and reference numeral 26 denotes a stepping motor.

The operation of the stepping motor control system shown in FIG. 2 will be discussed hereinafter. A position command is externally applied in a form of a rotational direction to the direction command entrance terminal 2 and a position command is externally applied in a form of a pulse train to the pulse train command entrance terminal 4. A rotational direction signal U/D and the pulse train command $P^*$ are converted into a position command $\theta^*$ by the counter 12. The step angle entrance terminal 6 is an entrance terminal into which a signal to determine the number of dividing of micro steps is inputted, and which sets a step angle $\theta d$ that is proportional to a rotation amount per 1 pulse. The position command correcting device 14 receives the position command $\theta^*$ and the step angle $\theta d$, and outputs a correction position command $\theta^{}$. A concrete example of a process for generating the correction position command $\theta^{}$ will be discussed hereinafter. The current command generating device 16 receives current amplitude commands $I\alpha p^*$, $I\beta p^*$ set in the current command entrance terminals 8, 10 and the correction position command $\theta^{**}$, and outputs current commands $i\alpha^*$, $i\beta^*$.

The current control device 18, the inverter 20 and the current detecting devices 22, 24 constitute a current controlling means that controls the applied voltage of the motor in such a manner that energization current $i\alpha f$, $i\beta f$ for the stepping motor 26 coincides with the current commands $i\alpha^*$, $i\beta^*$, and realizes the micro step driving.

Figure 3:
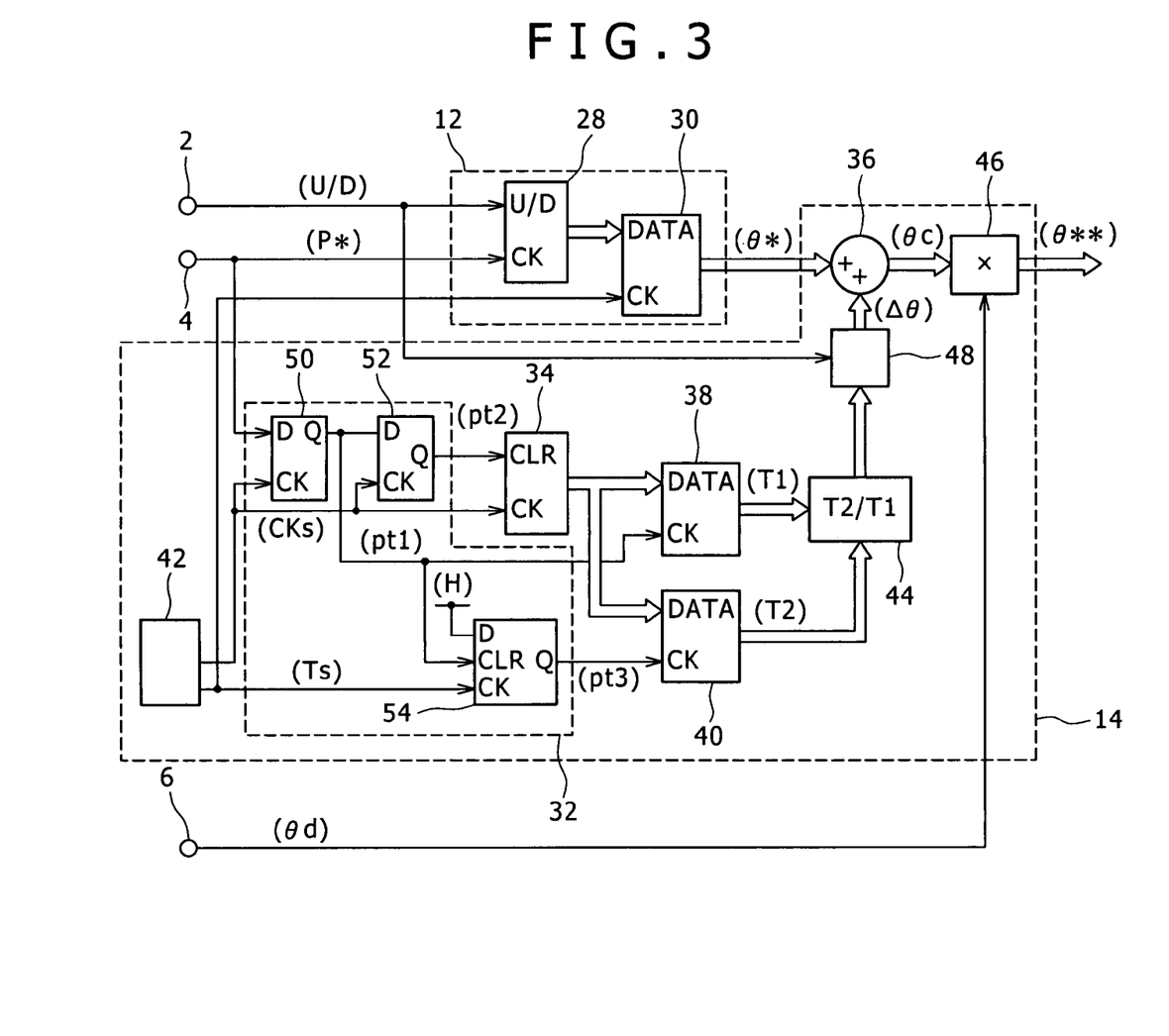
FIG. 3 is a detail view particularly illustrating a part of the stepping motor control system shown in FIG. 2.

Referring to FIG. 3, there is fully illustrated a part of the stepping motor control system shown in FIG. 2. The counter 12 is comprised of an up/down counter 28 (a first counting means) for counting the step number of the pulse train command $P^*$, and a latch circuit 30 (a latch means) for holding a counting value of the up/down counter 28 with a latch signal Ts. The up/down counter 28 carries out up-count or down-count of the number of steps of the pulse train command $P^*$ according to the rotational direction signal U/D. The latch circuit 30 holds the counting value of the up/down counter 28 with a latch signal Ts (signal in synchronization with the sampling signal) that is generated in a reference signal generating section 42, and converts the counting value into the position command $\theta^*$ that is a binary number value, per a predetermined period.

The position command correcting device 14 is comprised of a timing pulse generating means 32, a counter 34, an adder 36, a latch circuit 38, a latch circuit 40, a reference signal generating means 42, a divider 44, a multiplier 46 and a sign switching means 48. The counter 34 and the latch circuit 38 constitute a first calculating means. The counter 34 and the latch circuit 40 constitute a second calculating means.

Figure 4:
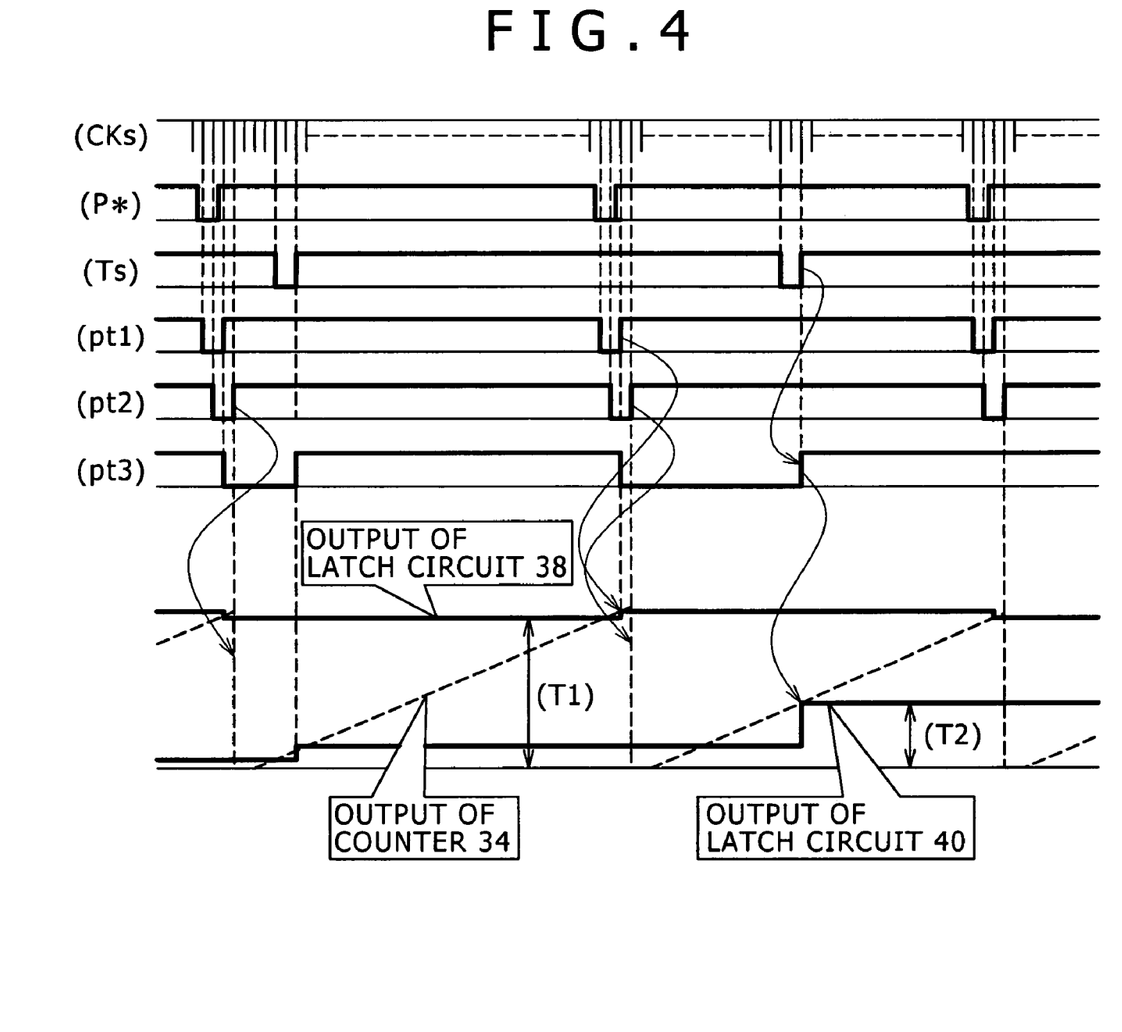
FIG. 4 is an explanatory view which is of assistance in explaining the operation of the stepping motor control system shown in FIGS. 2 and 3.

Referring now to FIG. 4, the operation of the position command correcting device 14 will be discussed hereinafter. The reference signal generating means 42 generates a reference clock signal CKs and the latch signal Ts as a control signal for the timing pulse generating means 32. The latch signal Ts is a signal that is obtained by carrying out the division of the reference clock signal CKs. The timing pulse generating means 32 produces internal control timing signals pt1, pt2, pt3 through flip-flops 50, 52, 54. The internal control timing signal pt1 is a signal that is obtained by sampling the pulse train command $P^*$ with the reference clock signal CKs. The internal control timing signal pt2 is a signal in which the internal control timing signal pt1 is delayed in time by one pulse of the reference clock signal CKs. The internal control timing signal pt3 is a signal that becomes "L" at a rising-edge of the internal control timing signal pt1 and returns to "H" at a rising-edge of the latch signal Ts.

Immediately after the pulse train command $P^*$ is inputted, the counter 34 is cleared at a rising-edge of the internal control timing signal pt2 and then counts a period of time to the generation of a next internal control timing signal pt2 by counting the reference clock signal CKs.

The latch circuit 38 holds the value of the counter 34 at the timing of the rising edge of the internal control timing signal pt1 immediately before the counter 34 is cleared. Thus, the output T1 of the latch circuit 38 (command pulse spacing information) is a value that corresponds to the time interval of the pulse train command $P^*$.

The latch circuit 40 holds the value of the counter 34 at the timing of the rising-edge of the internal control timing signal pt3. The rising-edge of the internal control timing signal pt3 substantially coincides with the rising-edge of the latch signal Ts. The output T2 of the latch circuit 40 (time difference information) is a value that corresponds to a time of from the inputting of the pulse train command P* to the generation of the latch signal Ts.

The divider 44 divides the output T2 of the latch circuit 40 by the output T1 of the latch circuit 38. The sign switching means 48 converts the output of the divider 44 into information with a sign that corresponds to the rotational direction signal. U/D, whereby the correction value Δθ is obtained. Incidentally, θd in the equation (1) is the step angle per one pulse of the pulse train command P* and, therefore, corresponds to a minimum change amount of the latch circuit 30. Thus, θd in the equation (1) for the correction value Δθ at the time when it is added to the position command θ* that is the output of the latch circuit 30 amounts to 1, so that the output of the sign switching means 48 corresponds to results that are obtained by carrying out the arithmetic operation of the equation (1).

A value that is obtained in the adder 36 by carrying out the addition of the position command θ* being the output of the latch circuit 30 and the correction value Δθ being the output of the sign switching means 48 corresponds to a position command θc after corrected, that is results obtained by carrying out the arithmetic operation of the equation (2). The correction value Δθ is a digit lower than a minimum digit of the position command θ*. The position command θc after corrected is a value that is obtained by linearly interpolating and extending a low order bit of the position command θ*.

The multiplier 46 carries out the multiplication of the position command θc after corrected that is the output of the adder 36 and the step angle θd, and converts the position command θc after corrected into a correction position command θ** that corresponds to the number of dividing of the micro step. That is, the output of the position command correcting device 14 is the input of the current command generating device 16 and is used as address information for searching amplitude data on a sine wave-like current command, so that, for example, when a comparison between a case where θd=1 and a case where θd=2 is made, a change in address per 1 pulse in the latter doubles that in the former. Therefore, revolution in the latter is made at a step angle that is doubled relative to revolution in the former.

Incidentally, the latch signal Ts of the reference signal generating device 42 is a signal that is obtained by dividing the reference clock signal CKs. By causing the micro step control for the stepping motor to be periodically carried out in synchronization with the latch signal Ts, there can be provided the motor control system in which vibration components associated with the sampling processing are decreased.

In the stepping motor control system according to the present invention, even if irregular time difference is produced between a cycle of the sampling processing and the generating time of the pulse train command applied from the external, error in the sampling of the position command can be reduced, so that fluctuation of the pulse train command P* is suppressed over a wide rotation range and stable sampling processing can be realized. Therefore, it is possible to cause the stepping motor to be smoothly rotated, without speeding up the processing speed of the microcomputer or the like.

Figure 5:
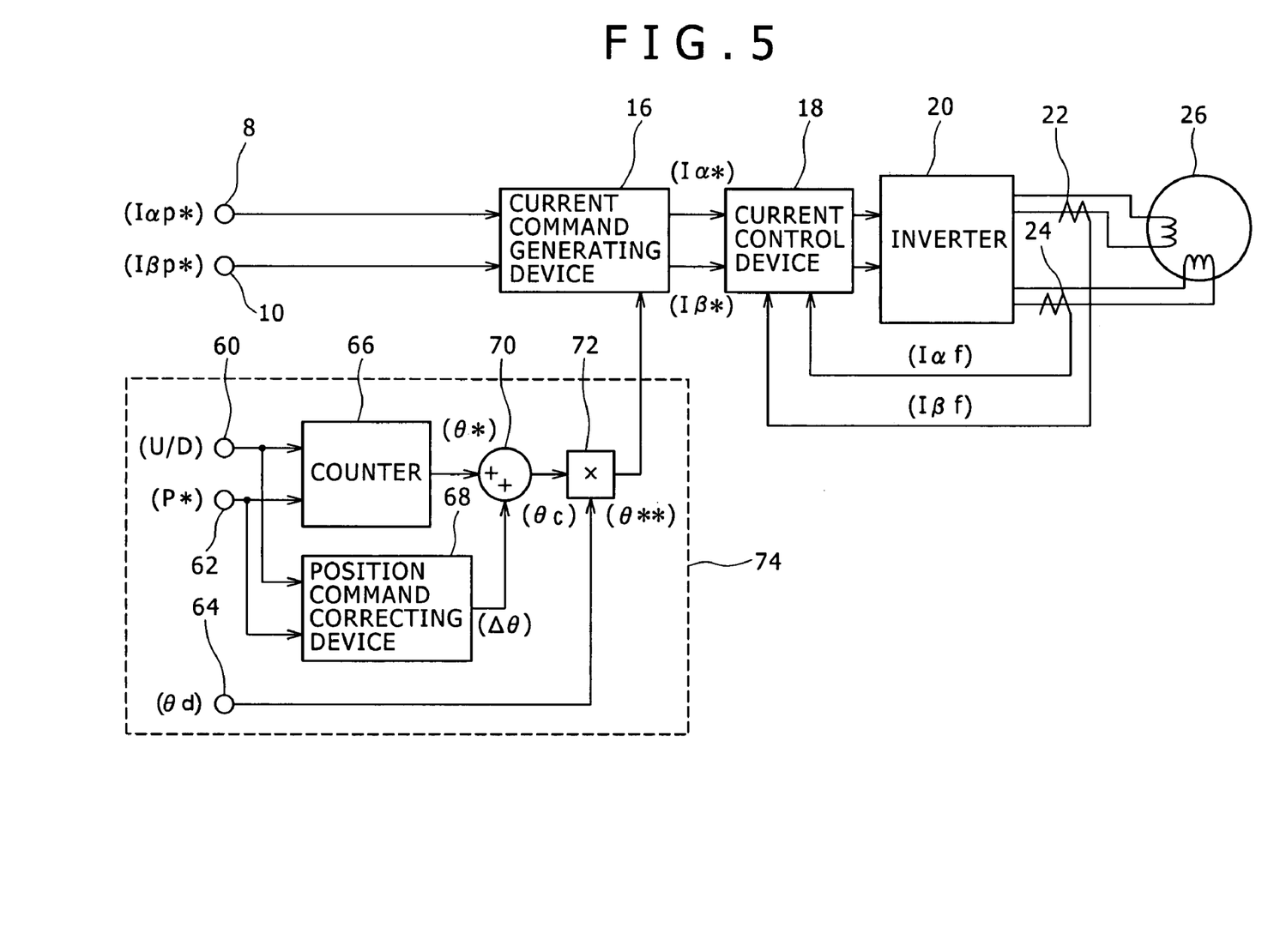
FIG. 5 is a view illustrating a stepping motor control system according to a second embodiment of the present invention.

Referring to FIG. 5, a stepping motor control system according to a second embodiment of the present invention will be discussed hereinafter. In FIG. 5, reference numeral 60 denotes a direction command entrance terminal, reference numeral 62 designates a pulse train command entrance terminal, reference numeral 64 denotes a step angle entrance terminal, reference numeral 66 designates a counter for converting the pulse train command P* into the position command θ*, reference numeral 68 denotes a position command correcting device, reference numeral 70 denotes an adder, and reference numeral 72 designates a multiplier. The direction command entrance terminal 60, the pulse train command entrance terminal 62, the step angle entrance terminal 64, the counter 66, the position command correcting device 68, the adder 70 and the multiplier 72 constitute a correction position command arithmetic means 74.

The operation of the stepping motor control system shown in FIG. 5 will be discussed hereinafter. The position command from the external is applied in a form of a rotational direction and pulse train to the direction command entrance terminal 60 and the pulse train command entrance terminal 62. A rotational direction signal U/D and a pulse train command P* are converted into a position command θ* in the counter 66. The step angle entrance terminal 64 is a terminal into which a signal for determining the number of dividing of micro steps is inputted, and which sets a step angle θd proportional to rotation amount per 1 pulse. The position command correcting device 68 receives the rotational direction signal U/D and the pulse train command P* and outputs a correction value Δθ. The adder 70 carries out the addition of the position command θ* and the correction value Δθ and finds a position command θc after corrected. The multiplier 72 carries out the multiplication of the position command θc after corrected, and the step angle θd proportional to the rotation amount per 1 pulse, and finds a correction position command θ. A concrete example of a process for producing the correction position command θ will be discussed hereinafter. The current command generating device 16 receives current amplitude commands Iαp*, Iβp* set in the current command entrance terminals 8, 10 and the correction position command θ**, and outputs current commands iαp*, iβp*.

Figure 6:
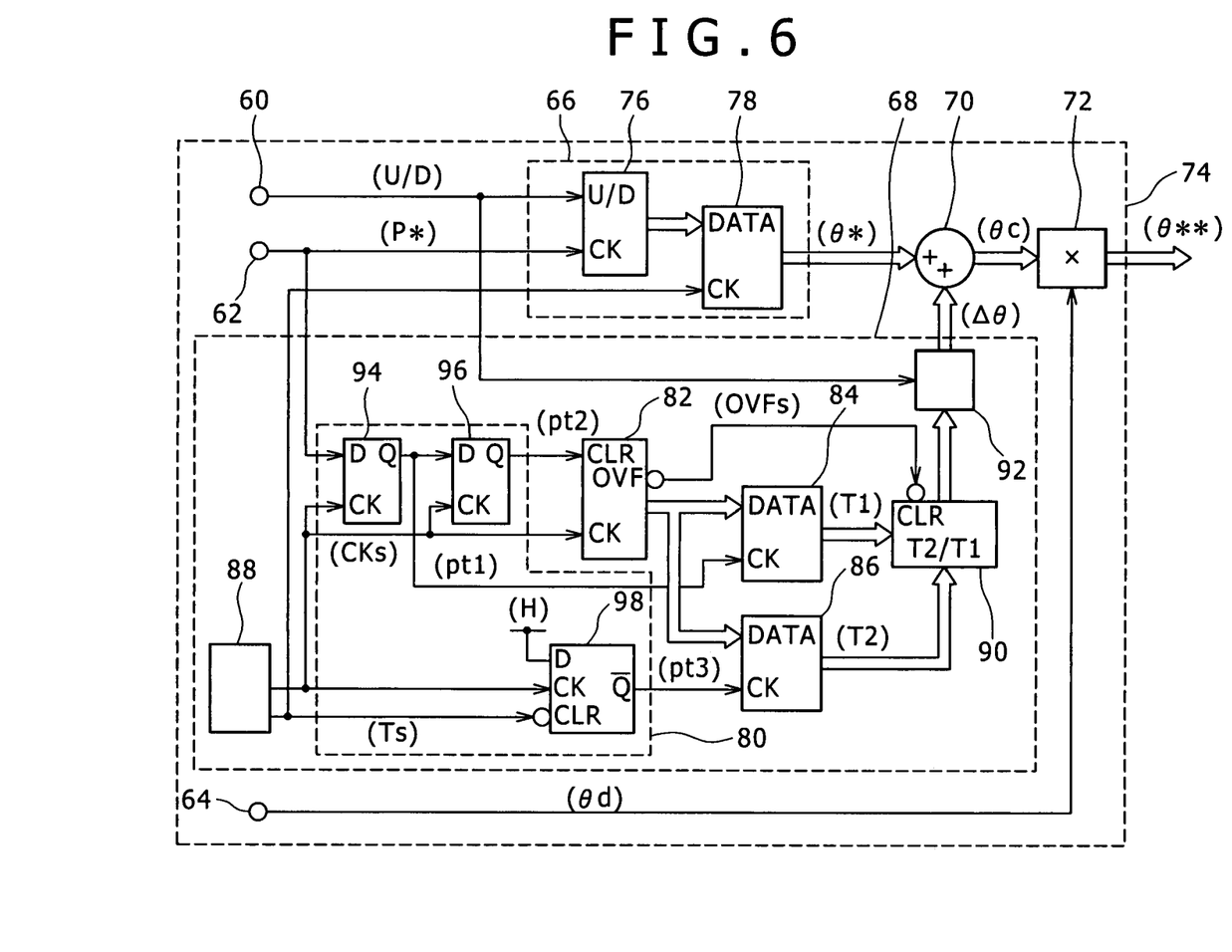
FIG. 6 is a detail view particularly illustrating a part of the stepping motor control system shown in FIG. 5.

FIG. 6 is a detail view illustrating a part of the stepping motor control system shown in FIG. 5. The counter 66 is comprised of an up/down counter 76 (a first counting means) for counting a step number of the pulse train command P*, and a latch circuit 78 (a latch means) for holding the counting value of the up/down counter 76 with a latch signal Ts. The up/down counter 76 carries out up-count or down-count of the number of steps of the pulse train command P* according to the rotational direction signal U/D. The latch circuit 78 holds the counting value of the up/down counter 76 with a latch signal Ts (signal in synchronization with the sampling signal) that is generated in a reference signal generating means 88, and converts the counting value into the position command θ* that is a binary number value, per a predetermined period.

The position command correcting device 68 is comprised of a timing pulse generating means 80, a counter 82 (a second counting means), a latch circuit 84, a latch circuit 86, a reference signal generating means 88, a divider 90 and a sign switching section 92. The counter 82 and the latch circuit 84 constitute a first calculating means. The counter 82 and the latch circuit 86 constitute a second calculating means.

Figure 7:
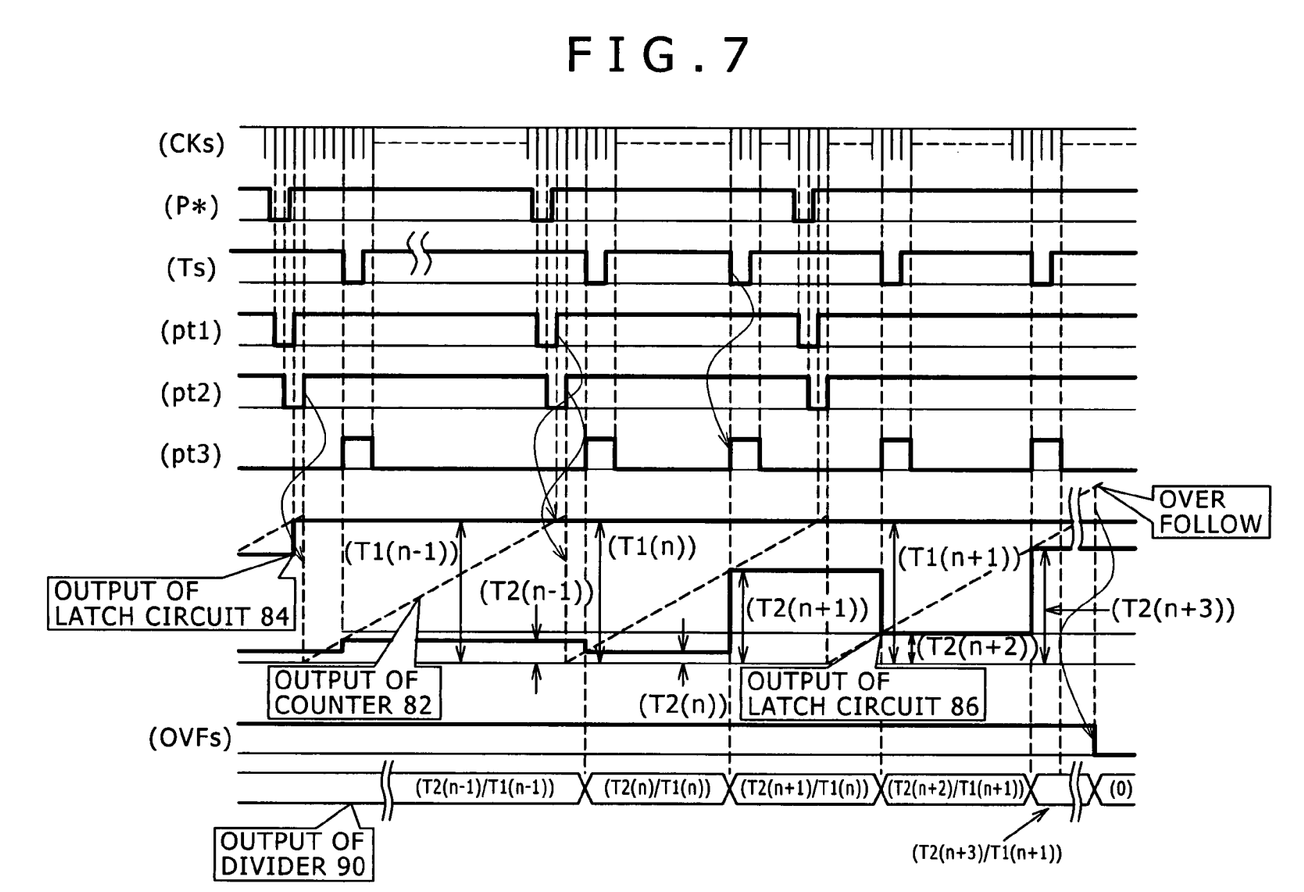
FIG. 7 is an explanatory view which is of assistance in explaining the operation of the stepping motor control system shown in FIGS. 5 and 6.

Referring now to FIG. 7, the operation of the position command correcting device 68 will be discussed hereinafter. The reference signal generating means 88 generates a reference clock signal CKs and the latch signal Ts as a control signal for the timing pulse generating means 80. The latch signal Ts is a signal that is obtained by carrying out the division of the reference clock signal CKs. The timing pulse generating means 80 generates internal control timing signals pt1, pt2, pt3 through flip-flops 94, 96, 98. The internal control timing signal pt1 is a signal that is obtained by sampling the pulse train command P* with the reference clock signal CKs. The internal control timing signal pt2 is a signal in which the internal control timing signal pt1 is delayed in time by one pulse of the reference clock signal CKs. The internal control timing signal pt3 is a signal which becomes "H" with a falling-edge of the latch signal Ts and returns to "L" with a rising-edge of the reference clock signal CKs.

Immediately after the pulse train command P* is inputted, the counter 82 is cleared with a rising-edge of the internal control timing signal pt2 and, thereafter, a period to generation of a next internal control timing signal pt2 is determined by counting the reference clock signal CKs.

The latch circuit 84 holds the value of the counter 82 at the timing of a rising-edge of the internal timing signal pt1 immediately before the counter 82 is cleared. Thus, the output T1 of the latch circuit 84 (command pulse interval information) amounts to a value that corresponds to a time interval of the pulse train command P*.

The latch circuit 86 holds a value of the counter 82 to the timing of a rising-edge of the internal control timing signal pt3. A rising-edge of the internal control timing signal pt3 substantially coincides with the falling-edge of the latch signal Ts. The output T2 of the latch circuit 86 (time difference information) amounts to a value that corresponds to a time of from the inputting of the pulse train command P* to the generation of the latch signal Ts.

The divider 90 carries out the division of the output T2 of the latch circuit 86 with the output T1 of the latch circuit 84. The sign switching means 92 converts the output of the divider 90 into information with a sign, that corresponds to the rotational direction signal U/D, thereby obtaining the correction value $\Delta\theta$. The output of the sign switching means 92 corresponds to results that are obtained by carrying out the arithmetic operation of the equation (1).

The counting value of the counter 82 is cleared by the rising-edge of the internal control timing signal pt2. However, when the stepping motor is brought to a stopped state, the pulse train command P* is not inputted, so that the internal control timing signal pt2 is left in H state. Therefore, the counting value of the counter 82 is not cleared and the counter 82 continues to count the reference clock signal CKs. Thus, the counting value of the counter 82 exceeds a predetermined value and the counter 82 overflows and outputs an overflow signal OVFs. When the overflow signal OVFs is inputted to the divider 90, the divider 90 outputs zero, so that the correction value $\Delta\theta$ amounts to zero. Therefore, when the stepping motor is brought to the stopped condition, the correction value $\Delta\theta$ amounts to zero.

A value that is estimated in the adder 70 by addition of the position command $\theta^*$ being the output of the latch circuit 78 and the correction value $\Delta\theta$ being the output of the sign switching means 92 corresponds to the position command $\theta c$ after corrected that is the results obtained by carrying out the arithmetic operation of the equation (2).

The multiplier 72 carries out the multiplication of the position command $\theta c$ after corrected that is the output of the adder 70 and the step angle $\theta d$, and converts the position command $\theta c$ into the correction position command $\theta^{**}$ corresponding to the number of dividing of the micro steps. That is, the output of the multiplier 72 is the input of the current command generating device 16 and is used as address information for searching amplitude data on the sine wave-like current command.

Incidentally, the latch signal Ts of the reference signal generating device 88 is a signal that is obtained by dividing the reference clock signal CKs. By causing the micro step control for the stepping motor to be periodically carried out in synchronization with the latch signal Ts, there can be provided the motor control system in which vibration components associated with the sampling processing are decreased.

In the stepping motor control system according to the second embodiment of the present invention, even if irregular time difference is produced between a cycle of the sampling processing and the generating time of the pulse train command applied from the external, error in the sampling of the position command can be reduced, so that fluctuation of the pulse train command P* is suppressed over a wide rotation range and stable sampling processing can be realized. Therefore, it is possible to cause the stepping motor to be smoothly rotated, without speeding up the processing speed of the microcomputer or the like. Furthermore, when the stepping motor is brought to the stopped condition, the correction value $\Delta\theta$ amounts to zero, so that the stepping motor is stopped at a location corresponding to a multiple of the step angle $\theta d$.

The present invention can be applied to a speed control system for a stepping motor utilizing a pulse train as a command, a position control system for an AC servomotor utilizing a pulse train as a command, and a speed control system for the AC servomotor, in addition to a stepping motor control system for the purpose of position-controlling.

Furthermore, while the case where the pulse train command is applied in the form of the rotational direction and pulse train is described above, the pulse train command can be applied in another form such as a pulse train command according to a direction, and a second phase rectangular wave pulse train command.

Furthermore, while the present invention is applied to the motor control system that carries out the control utilizing the microcomputer or the like, the present invention can be also applied to all of control systems that carry out sampling processing with respect to signals that are asynchronously inputted from the external.

Moreover, a control system that carries out sampling processing is equipped with a microcomputer or the like and often carries out software processing. The present invention can be applied not only to a software processing system but also to a control system comprised of hardware.

The terms and expressions that have been employed are used as terms of description and not of limitation. There is no intention in the use of such terms and expressions to exclude any equivalents of the features described or any portions thereof. It is recognized, however, that various modifications are possible within the scope of the invention claimed.

What is claimed is:

1. A motor control system for energizing a sine wave-like stairway current according to a pulse train command impressed from an external;

said motor control system comprising:

a first counting means for counting the number of steps of said pulse train command;

a latch means for holding a counting value of said first counting means with a latch signal and finding a position command;

a reference signal generating means for generating said latch signal and a reference clock signal;

a first calculating means for calculating a pulse spacing of said pulse train command with said reference clock signal; and a second calculating means for calculating a time interval of from generation of said pulse train command to generation of said latch signal with said reference clock signal;

wherein said position command is corrected using command pulse spacing information calculated by said first calculating means and time difference information calculated by said second calculating means.

2. A motor control system according to claim 1, wherein said motor control system is designed such that said motor control system periodically carries out micro step control for a stepping motor synchronously with said latch signal.

3. A motor control system according to claim 1, wherein said motor control system is designed such that said motor control system causes a correction value of said position command to amount to zero at the time when a motor is stopped.

4. A motor control system according to claim 3, wherein said motor control system includes a second counting means for counting said reference clock signal, clearing a counting value when said pulse train command is output, and outputting an overflow signal when said counting value exceeds a predetermined value, and wherein said motor control system is designed such that said motor control system causes said correction value to amount to zero when said overflow signal is output.

* * * * *